Nov. 30, 1943.     C. W. McCOY     2,335,780
TESTING APPARATUS
Filed Aug. 19, 1941     2 Sheets-Sheet 1

CHARLES WILSON McCOY,
INVENTOR

BY
Harold W. Mattingly
ATTORNEY.

Nov. 30, 1943.   C. W. McCOY   2,335,780
TESTING APPARATUS
Filed Aug. 19, 1941   2 Sheets-Sheet 2
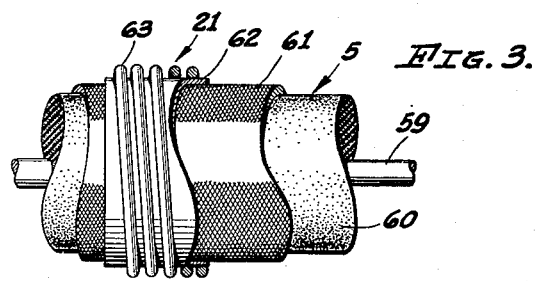
Fig. 3.
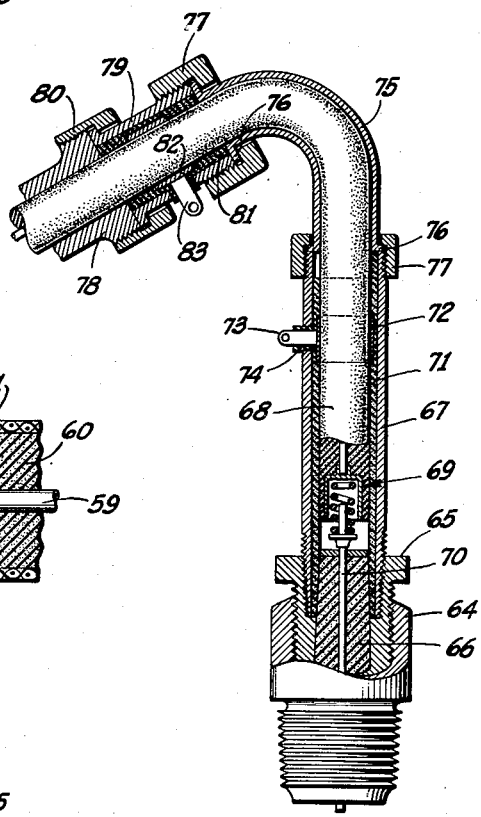
Fig. 4.
Fig. 5.
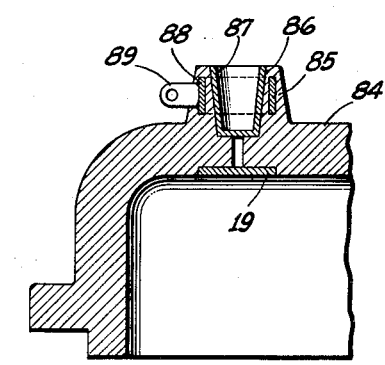
Fig. 6.
CHARLES WILSON McCOY,
INVENTOR
BY
*Harold W. Mattingly*
ATTORNEY.

Patented Nov. 30, 1943

2,335,780

UNITED STATES PATENT OFFICE 2,335,780

TESTING APPARATUS

Charles Wilson McCoy, Glendale, Calif.

Application August 19, 1941, Serial No. 407,422

8 Claims. (Cl. 175—183)

My invention relates to a testing apparatus and has particular reference to a device for testing the component parts of high tension ignition systems which finds particular utility when employed to analyze and determine the character of ignition troubles in aircraft engines.

With the recent increases in power out-put and efficiency of aircraft engines there has occurred a very considerable increase in the number and frequency of engine troubles which can be traced dirctly to ignition failures. This is due partly to the increase in use of shielding on the high tension circuits to eliminate radio interference and partly to the increase in compression ratios of the engines.

Modern aircraft engines employ as many as fourteen cylinders and generally employ dual ignition systems, each system consisting of a magneto, a distributor and a spark plug for each of the cylinders. Thus, faulty operation which it is suspected is caused by a faulty spark plug can only be checked by checking each of the twenty-eight spark plugs. Prior to my invention there was no ready and convenient way of checking the operation of each of the twenty-eight plugs, and it is the present practice under these circumstances to remove and discard all twenty-eight plugs and replace them with new plugs, often to discover that the difficulty was not in the spark plugs but in the high tension wiring or the magnetos. Frequently replacing the spark plugs and checking the wiring and the magneto operation will still fail to cure the difficulty since not infrequently a new and unused spark plug is found to be defective. Thus, discarding twenty-seven good spark plugs for the purpose of removing one bad spark plug may result only in replacing the discarded plugs with twenty-seven good ones and one which, although never before used, is defective. This is obviously an expensive and uneconomical procedure but prior to my invention no other method was known for accurately and definitely determining which part of the ignition system was giving trouble.

It is, therefore, an object of my invention to provide a testing apparatus for ignition systems which includes a means for providing direct and comparative indications of the operating conditions of the various component parts of the system.

It is also an object of my invention to provide a testing apparatus of the character set forth in the preceding paragraph which includes a means for separately and independently measuring the high voltage which is applied to each of the spark plugs of a multi-cylinder engine.

It is a still further object of my invention to provide a testing apparatus of the character set forth in the preceding paragraphs which includes a means for measuring and comparing the primary voltage developed by each of the magnetos of a dual ignition system.

It is an additional object of my invention to provide a testing apparatus of the character previously referred to which includes a means for measuring the voltage of the high tension side of the ignition system without, however, extracting from the system an appreciable amount of power.

It is also an object of my invention to provide a testing apparatus of the character set forth in the preceding paragraphs which includes a pick up device for picking up a voltage at each of the spark plugs of a high tension ignition system, an amplifier for amplifying the voltages picked up without drawing any power from the high tension circuits, and a volt meter connected to the out-put of the amplifier.

It is a still further object of my invention to provide a testing apparatus of the character set forth in the preceding paragraph which includes a selector switch for selectively connecting the amplifier and volt meter to each of a plurality of pick up circuits in succession.

It is additionally an object of my invention to provide an apparatus of the character set forth in the preceding paragraphs which is adapted to be either installed permanently on an aircraft permitting the pilot thereof to check the operation of the ignition system at will or arranged as a portable test unit which may be connected to the ignition systems of any aircraft engine equipped to afford such connection.

Other objects and advantages of my invention will be apparent from a study of the following specification, read in connection with the accompanying drawings, wherein:

Fig. 3 is a fragmentary elevational view of a high tension spark plug conductor illustrating one form of pick up device which may be used to pick up high tension voltages to convey the same to the testing apparatus;

Fig. 4 is a fragmentary longitudinal sectional view illustrating a modified form of pick up construction;

Fig. 5 is an elevational view illustrating a spark plug and gooseneck connection therefor such as is employed on aircraft engines and illustrating also two alternative types of pick up connections which may be employed; and Fig. 6 is a fragmentary sectional view of a magneto distributor cap and illustrating a still further form of pick up device.

Figure 1:
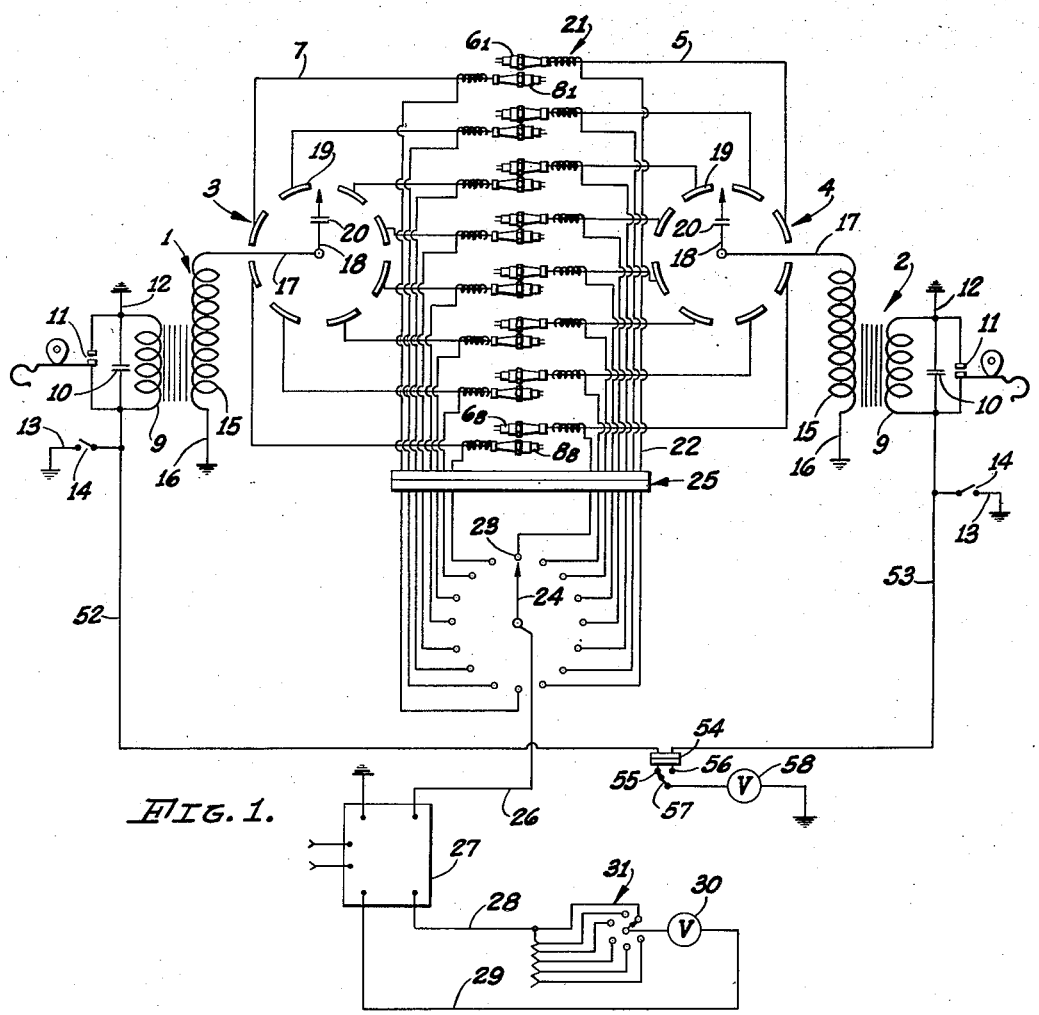
Fig. 1 is a schematic diagram illustrating a typical form of dual ignition system such as is employed on aircraft engines and the electrical connections employed in the preferred embodiment of the test apparatus of my invention.

Referring to the drawings, I have illustrated in Fig. 1 a dual ignition system such as is employed on aircraft engines as including magnetos 1 and 2 each provided, respectively, with distributors 3 and 4. The magneto 2 and distributor 4 are connected by means of high tension conductors 5 to one set of spark plugs comprising spark plugs $6_1$ through $6_8$, it being understood that one of each of the spark plugs 6 is associated with one of each of the cylinders of the aircraft engine, the arrangement which is illustrated in Fig. 1 being that which is employed on an eight cylinder engine equipped with dual ignition. Similarly, the magneto 1 and distributor 3 are connected by means of high tension conductors 7 to a set of spark plugs comprising plugs $8_1$ through $8_8$, each of the plugs of this set being also arranged one for each of the eight cylinders of the engine.

The magnetos 1 and 2 are ordinarily identical and include a primary winding 9 which is shunted by the usual primary condenser 10, breaker points 11 being connected in parallel with the condenser 10. One terminal of the winding 9 is ordinarily grounded as at 12 and the other terminal is connected to ground through a circuit 13 which includes a shorting switch 14 employed for the purpose of stopping the engines. The magnetos 1 and 2 also include a high tension secondary winding 15 one terminal of which is grounded as indicated at 16 and the other terminal of which is connected as by means of a conductor 17 to a rotor 18 forming a part of the distributor 3. The rotor 18 is coupled to the engine so as to be rotated therewith in proper time sequence past a plurality of contact segments 19 so as to selectively establish a circuit from the high tension conductor 17 to the high tension conductors 7 and so energize each of the spark plugs 8 at the proper time.

Recently an increase in the high tension voltage developed by the magnetos 1 and 2 has been achieved by employing a small condenser 20 in series with the contact arm 18, this condenser being hereinafter referred to as the secondary condenser.

The testing apparatus of my invention includes a plurality of pick up units 21, one of such units being employed for each of the spark plugs $6_1$—$6_8$ and $8_1$—$8_8$. Each of the pick up units 21 is connected by means of a conductor 22 to corresponding switch points 23 of a selecting means which may conveniently comprise a rotary selector switch including a movable arm 24 adapted to be moved into contacting position with any one of the switch points 23.

For convenience in construction, the conductors 22 are all preferably included in a single multi-conductor cable and means for readily disconnecting such cable may comprise a plug and receptacle combination illustrated diagrammatically at 25 in Fig. 1. The cable containing conductors 22 is preferably shielded to prevent interference with radio equipment contained in the aeroplane.

The switch arm 24 is preferably connected as by means of a conductor 26 to the in-put circuit of an alternating voltage amplifier represented in Fig. 1 by the rectangle 27. The output of the amplifier 27 is connected by means of a circuit including conductors 28 and 29 to a volt meter 30 or other suitable indicating device. The circuit 28—29 preferably includes also a multiplier arrangement indicated generally by reference character 31 and employed for the purpose of permitting an operator of the device to choose the most appropriate scale on the meter for the particular equipment being tested.

The pick up units 21 are not metallically connected to the conductor portion of the high tension spark plug wires 5 and 7, but are instead either arranged to provide a capacity or inductive coupling with such conductor. Thus, radio frequencies or other high voltage alternating currents flowing in the high tension spark plug conductors 5 and 7 will serve to induce at least a small voltage in the conductors 22 through the medium of the pick up units 21. The voltage which is induced in the conductors 22 is, of course, directly proportional to the voltage which is impressed on the spark plug wires 5 and 7. The amplifier 27 functions to so amplify the relatively low voltages which are induced in the conductors 22 as to provide adequate power for operating the meter 30 so as to give direct comparative readings of the voltage which is applied to the terminals of the spark plugs without requiring any power to be taken from the high tension circuits.

Figure 2:
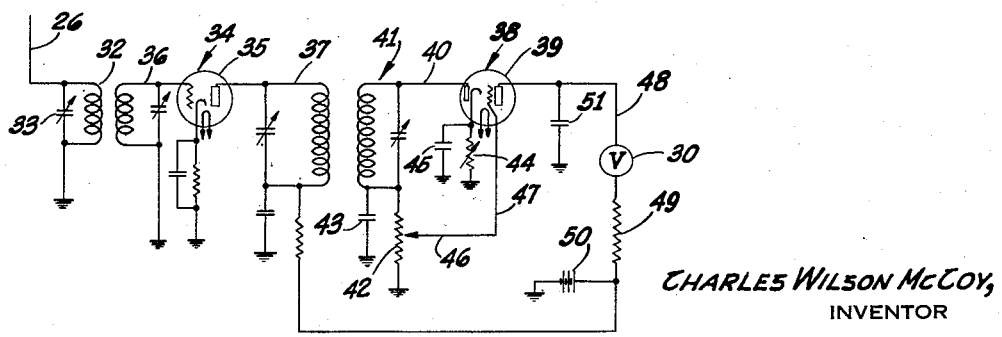
Fig. 2 is a schematic wiring diagram illustrating one form of amplifier circuit which may be employed in the amplifier portion of the apparatus of my invention.

In accordance with the intent to avoid extracting any power from the high tension circuits, the amplifier is preferably provided with a very high impedance in-put circuit. One form of amplifier circuit which is particularly adapted for use as the amplifier 27 is illustrated in Fig. 2. It will be noted that the conductor 26 is connected to ground through a tank circuit including an inductance 32 and a capacity 33. The inductance 32 is inductively coupled to one or more thermionic amplifier stages, one of which is indicated generally by reference character 34 and which may be of conventional construction employing a thermionic vacuum tube 35 including a tuned grid circuit 36 and a tuned plate circuit 37 so that all but certain desired bands of audio-frequency current will be filtered out of the circuit.

The out-put stage of the amplifier indicated generally by reference character 38 preferably includes a thermionic vacuum tube 39 of the well known dual type which includes a diode or rectifier section and a triode or multi-element amplifier section, although it is realized that separate rectifier and amplifier tubes could also be used.

The diode plate is connected by means of a conductor 40 to one end of a tuned tank circuit 41 which is inductively coupled to the out-put circuit 37 of the preceding amplifier stage. The other end of the tank circuit is connected to ground through a potentiometer 42 which may be, if desired, by-passed by a condenser 43. The cathode circuit includes a variable resistance 44 connected between the cathode of the tube 39 and ground and shunted by a by-pass condenser 45.

The arm 46 of the potentiometer 42 is connected as by means of a conductor 47 to the grid of the tube 39 and the amplifier plate is connected as by means of a conductor 48 to the indicating meter 30 which is in turn connected through a resistance 49 to the positive terminal of a suitable source of plate potential 50 for the vacuum tubes. The conductor 48 may be by-passed to ground if desired as by means of a condenser 51.

The cathode resistance 44 is preferably variable and may be adjusted to give a full scale deflection of the meter 30 when no signal is applied to the in-put conductor 26. When a voltage such as that picked up by the pick up units 21 is applied to the condenser 26, the same will be amplified and a corresponding amplified voltage will be applied between the diode plate and the cathode of the out-put tube 39. This will cause a rectified voltage to appear across the potentiometer 42 and a part of this voltage is picked off by the potentiometer arm 46 and applied to the grid of the tube 39 to produce a reduction in the plate current of the tube which causes the deflection of the meter 30.

It will be observed that by varying the position of the arm 46 on the potentiometer 42, the range of the meter 30 is correspondingly changed. Thus the potentiometer 42 may be employed to serve the purpose which is served by the multiplier system 31 illustrated in Fig. 1, whereas, the variable resistance 44 serves as a means for setting the zero or index point on the meter scales.

Preferably the amplifier circuit illustrated in Fig. 2 is tuned to radio frequencies, it being found that alternating voltages of radio frequencies are more easily picked up by the pick up units 21. It is realized, however, that voltages of lower frequencies may also be induced in the test conductors 22.

The testing device of my invention preferably also includes a means for testing the primary voltage of the magnetos 1 and 2 and accordingly conductors 52 and 53 are extended from the ungrounded terminal of the short circuiting switches 14 through a suitable plug and receptacle cord connector 54 to terminals 55 and 56 of a selector switch whose movable arm 57 is connected through a meter 58 to ground. Thus, the selector switch 57 may be employed to connect the meter 58 to the ungrounded side of the primary windings 9 of either of the magnetos 1 and 2 so as to permit a direct determination of the primary voltage which is generated by each of the magnetos.

To use the device, the above described electrical connections are established and the selector switch 24 is turned to a position establishing a test connection with one of the spark plugs. The meter multiplier is then adjusted to provide nearly a full scale deflection on the meter 30, whereupon the selector switch 24 is rotated to provide similar readings for each of the plugs. Upon comparing all of the readings thus obtained, it may be found that one or more of the plugs gives a different reading than do the rest. From the character of this reading, the ignition trouble may be diagnosed. For example, if one of the plugs shows a higher voltage than do all of the others, that plug either has too wide a spark gap or the electrical circuit to the plug is opened at some point between the pick up device and the spark gap points. Similarly, if one plug shows a lower voltage than do the remainder, that plug is dirty or has faulty and leaky insulation. If an extremely low or zero reading is obtained on one plug, either the plug is short circuited or the high tension circuit leading to the plug is short circuited. By this means the plug which is causing difficulty is readily and accurately identified, it being my intention to provide a pointer or indicator on the selector switch 24 which will indicate by means of suitable indicia inscribed on an indicator plate which of the plugs is being tested by the connection established by the then position of the indicator.

If, in making the test as above described, it is found that the voltage measured at all of the plugs is subject to fluctuation, then magneto trouble is indicated. The magnetos may be tested by having reference to the volt meter 58 which may be connected first to one magneto and then to another by use of the selector switch 57. If this meter fluctuates while the engine is running at near to normal speed, primary condenser or breaker point troubles are indicated such as improper breaker point spacing or dirty or pitted points. If a lower than standard voltage is indicated by the volt meter 58, an increased load on the secondary of the magneto is likewise indicated. This is generally caused by defective insulation in the secondary condenser 20.

It will thus be noted that the device of my invention may be used to readily and accurately determine the operating characteristics of each of the spark plugs employed on a multi-cylinder engine and may also be used to determine the operating characteristics of the magnetos. Thus ignition difficulties can be accurately located and diagnosed in a minimum length of time and without requiring the replacement of all of the spark plugs as is the present practice.

I have illustrated in Fig. 3 one form of pick up unit 21 which may be employed in connection with the high tension conductor 5. This high tension conductor is illustrated in Fig. 3 as comprising a central wire 59 which is surrounded by suitable insulating material such as vulcanized rubber 60, the rubber 60 and conductor 59 being also enclosed within a grounded metal shield 61 usually formed as a tubular metal band. About the shield 61 I provide a relatively short cylinder 62 formed of insulating material and upon this cylinder I wind a short helix 63 of copper wire or other suitable conductor, which helix is connected to the associated test conductor 22.

The helix 63 serves to couple the conductor 22 to the conductor 59 with a very loose coupling which is probably mainly inductive but which undoubtedly includes also a capacity coupling component. The capacity coupling is, of course, materially reduced by the presence of the shield 61. In case the shield 61 is found to be so effective as to prevent the pick up device 21 from picking up a sufficient voltage to operate the indicating device, a coupling unit such as that illustrated in Fig. 4 may be employed. This coupling unit is identical with the unit illustrated in Fig. 3 except that the pick up coil which is indicated by reference character 63a is positioned internally of the shield 61 rather than externally thereof.

Fig. 5 illustrates two other modified forms of pick up devices, both particularly adapted to be positioned near a spark plug and particularly adapted for use with the modern type of shielded spark plug, such as is employed in aircraft engines. A typical form of shielded plug construction is illustrated in Fig. 5 wherein the plug body 64 is provided with a clamping nut 65 adapted to secure a porcelain or mica insulator 66 to the plug body. The nut 65 is interiorly threaded to receive a metallic shielding tube 67, within which the high tension spark plug conductor, indicated at 68, is positioned. This conductor is fitted at its lower end with a spring pressure contact device indicated generally by reference character 69 and adapted to effect electrical connection between the conductor contained in the wire 68 and the center electrode 70 of the spark plug.

The high tension wire 68 is normally spaced from the shielding sleeve 67 as by means of an insulating sleeve 71 formed of a molded plastic material or other suitable insulating compound. I propose to embed within the sleeve 71 a relatively thin and narrow metallic band 72 and provide this band with a radially extending lug 73 to which the test conductor may be connected. The lug 73 may be extended through an aperture 74 provided in the shield 67 and insulated from the shield by extruding a part of the insulating material 71 through the aperture 74 in a position surrounding the lug 73.

Fig. 5 also illustrates a typical form of "gooseneck" which is employed with shielded type plugs. This gooseneck comprises merely a curved piece of metallic tubing 75, through which the conductor 68 is extended. Opposite ends of the elbow 75 are flanged as at 76 to permit a clamping nut 77 to be employed to secure the elbow 75 to the shielding tube 67. The uppermost flange 76 and associated clamping nut 77 are ordinarily employed to attach to that end of the elbow 75 the end of the flexible shielding which is indicated by reference character 78.

As an alternative form of pick up device, I propose to interpose between flange 76 and the end 78 of the shielding a small coupling unit comprising a section of threaded metallic tubing 79 adapted to be engaging by the clamping nut 77 and in turn carrying a clamping nut 80 adapted to engage the end of the shielding 78. Within the tube 79 I position an insulating sleeve 81 within which is embedded a relatively thin and narrow pick up band 82, this band being provided with a radially extended lug 83 which is extended exteriorly of a tube 79 through a suitable aperture provided therein, the lug 83 being also surrounded and insulated from the tube 79 by the insulating material 81.

A similar pick up construction is illustrated in Fig. 6 as being associated with a distributor cap 84 which is employed to support and carry the distributor contacts 19. The cap 84 is ordinarily formed of molded material such as "Bakelite" or other plastic material and is formed with a plurality of upwardly extending bosses 85. These bosses are provided with tapering bores 86 which are lined with metal cylinders 87 electrically connected to the contact points 19, the sleeves 87 serving to establish an electrical connection between the contact 19 and the high tension spark plug conductors 6 or 7.

In the form of my invention which is illustrated in Fig. 6 a pick up member comprising a cylindrical band 88 is embedded in the plastic material forming the bosses 85 in a position encircling the sleeve 87 but electrically insulated therefrom. A lug portion 89 may be extended exteriorly of the bosses 85 to permit connecting the test conductor 22 thereto.

It will be observed that I have disclosed a number of different types of pick up units which may be employed to establish a test connection between the test conductors 22 and each of the spark plug wires 6 or 7. It will be noted that in each instance the coupling which is extended between the spark plug wires and the test conductors 22 is extremely loose so that an infinitesimal amount of power is picked up by the test conductors, it being my intention to induce only a voltage in these wires and to avoid to the greatest extent possible the drawing of any current from the high tension spark plug circuits.

Reference has been made hereinbefore to the use of the plug and receptacle connectors 25 and 54. It is intended that the receptacle portions of such connectors be permanently mounted on the engine housings of an aircraft so that the test equipment which is electrically connected to the plug portions of these connectors may be arranged for portable operation, thereby permitting the testing equipment to be connected to each of the various motors of any number of aircraft. By so arranging the equipment, one of the testing devices of my invention may be used to maintain the ignition systems of a considerable number of aircraft in first class operating condition.

It will be appreciated, of course, that the plug and receptacle connectors 25 and 54 may be omitted if it is desired to mount the testing device in the aeroplane as one of the permanently installed instruments. If an installation of this type is effected, the selector switch 24 would either be provided with a sufficient number of points to receive all of the test conductors 22 from all of a plurality of aeroplane engines or else a separate selector may be inserted in the conductor 26 to permit selectively connecting the conductor 26 to any one of a plurality of selector switches 24, there being employed one of such selector switches 24 for each of the engines of the aircraft.

From the foregoing it will be observed that I have provided a testing apparatus by means of which ignition troubles in aircraft engines may be readily and accurately diagnosed and by means of which an operator may ascertain not only which part of the electrical equipment is giving trouble, but also the manner in which such particular piece of equipment is defective.

While I have shown and described the preferred embodiment of my invention, I do not desire to be limited to any of the details of construction shown or described herein, except as defined in the appended claims.

I claim:

1. In an apparatus for testing a plurality of high tension ignition circuits separately, the combination of: a test conductor for each of said circuits; a pick up device for each of said conductors loosely coupled between said conductors and said circuit to induce in said conductor an alternating voltage proportional to the high tension alternating voltage of said circuit; an alternating voltage amplifier; selector means for separately connecting said amplifier to any selected one of said conductors; and a visual indicator coupled to said amplifier for indicating the relative voltages of each of said high tension circuits as selected by the selector means.

2. In an apparatus for testing a plurality of high tension ignition circuits separately, the combination of: a test conductor for each of said circuits; a pick up device for each of said conductors loosely coupled between said conductors and said circuit to induce in said conductor an alternating voltage proportional to the high tension alternating voltage of said circuit; an alternating voltage amplifier; selector means for separately connecting said amplifier to any selected one of said conductors; and a volt meter connected to said amplifier to indicate the voltages induced in the selected one of said conductors as amplified by said amplifier.

3. In an apparatus for separately testing a plurality of high tension ignition circuits, the combination of: a vacuum tube volt meter; and means for loosely coupling said volt meter to each of said circuits selectively.

4. In an apparatus for testing a plurality of high tension ignition circuits, the combination of: a volt meter; coupling means for separately connecting said volt meter to each of said circuits selectively; and means associated with said coupling means for actuating said volt meter in accordance with the alternating voltage in said high tension circuits without drawing current from said circuits.

5. In an apparatus for testing a high tension ignition circuit, the combination of: a vacuum tube volt meter including a radio frequency alternating voltage amplifier having a tuned input circuit; and means for loosely coupling said input circuit to said circuit to be tested.

6. In an apparatus for testing a high tension ignition circuit, the combination of: a volt meter; coupling means for connecting said volt meter to said circuit to be tested; and means associated with said coupling means for actuating said volt meter in accordance with the alternating voltage in said high tension circuit without drawing current from said circuit.

7. An apparatus for separately testing a plurality of high tension ignition circuits, comprising a pick-up device for each of said circuits permanently associated therewith to receive induced current therefrom, a series of conductors, one for each of said pick-up devices, a selector connected with the series of conductors and to make separate electric contact with a selected individual conductor, an alternating voltage amplifier connected to the selected conductor by the selector, said amplifier including a tuned induction circuit receiving the input from the selector, an input stage amplifying structure connected therewith, an output stage amplifying structure receiving current from the input stage by induction, means for varying the strength of the output stage signal, and a voltmeter for measuring the magnitude of the output stage voltage.

8. An apparatus for separately testing the high tension ignition circuits passing through a series of conductors to complementary spark plugs of an internal combustion engine, which comprises a pick-up device for each of said conductors permanently associated therewith in a manner to form a loose coupling between the individual pick-up devices and the conductors associated therewith, whereby a high tension alternating voltage circuit will be induced in said pick-up devices, separate pick-up conductors, one for each of said pick-ups, a selector to which the pick-up conductors are individually connected, a conduit leading from said selector and with which an individual pick-up conductor may be selectively and electrically connected, an alternating voltage amplifier connected with said conduit, said amplifier including multiple stage amplification units inductively coupled together, an inductive coupling between the first stage of said amplification and the conduit leading from the selector, means for tuning the input current to selected bands of radio frequency, and a voltmeter to which current is delivered from the output stage of said amplification and by which the magnitude of the high tension voltage derived from the selected pick-up device will be indicated.

CHARLES WILSON McCOY.